June 3, 1941.  E. L. BACON  2,244,417

INERTIA REGISTER FOR VEHICLES

Filed June 13, 1938

Inventor
EVERETT L. BACON.

By Edward V. Hardway
Attorney

Patented June 3, 1941

2,244,417

UNITED STATES PATENT OFFICE 2,244,417

INERTIA REGISTER FOR VEHICLES

Everett L. Bacon, Houston, Tex.

Application June 13, 1938, Serial No. 213,556

2 Claims. (Cl. 235—91)

This invention relates to an inertia register for vehicles.

An object of the invention is to provide a registering device of the character described adapted to be mounted on a vehicle and effective to register, or count abnormal movements of the vehicle.

It is another object of the invention to provide a registering device whereby abnormal, or sudden startings and stoppages of the vehicle will be indicated. The registering device, or counter, is suitable for use on any type of vehicle but has been more particularly designed for use on busses and other public carriers such as taxi cabs and the like and is particularly useful to furnish information, to the management, of the handling, by the driver, of the vehicle.

It is a further feature of the invention to provide a device of the character described whereby a signal, or warning will be given to the operator of the vehicle of abnormal, or too sudden, starting or stoppage of the vehicle.

A still further object of the invention is to provide a device of the character described embodying registering devices and means operative under the influence of inertia for actuating said devices as well as for giving warning signals to the driver, all enclosed and protected within an enclosing casing so as to be inaccessible to prevent unauthorized interference with the operation thereof.

With the above and other objects in view the invention has particular relation to certain novel features of construction, operation and arrangement of parts, an example of which is given in this specification and illustrated in the accompanying drawing, wherein.

Figure 1:
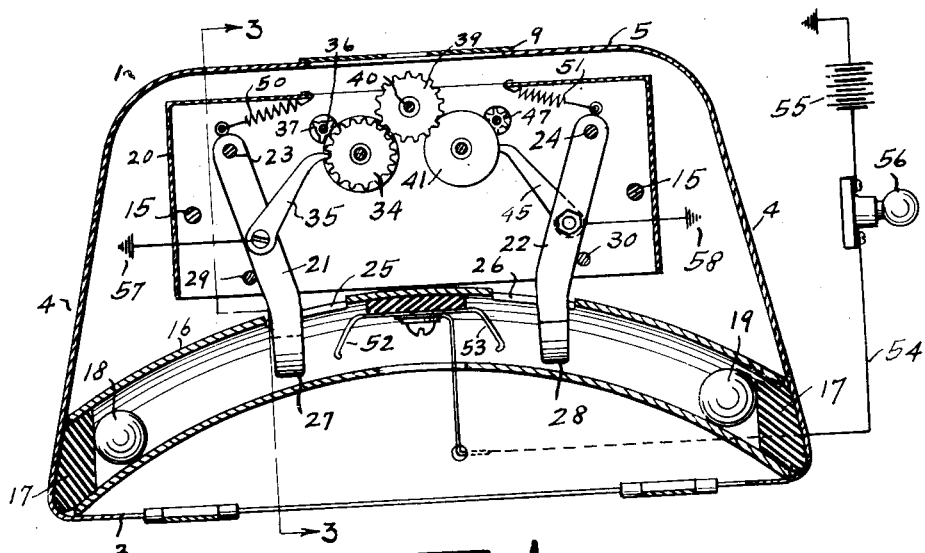
Figure 1 shows a vertical, sectional view of the apparatus taken on the line 1—1 of Figure 3.

Referring now more particularly to the drawing wherein like numerals of reference designate the same parts in each of the figures, the numeral 1 designates the casing as a whole. One side 2, the bottom 3, the ends 4, 4 and the top 5 of the casing may be formed integral, or in fixed relation to each other while the other wall 6 may have its lower margin connected at the bottom by the hinge 7.

Figure 2:
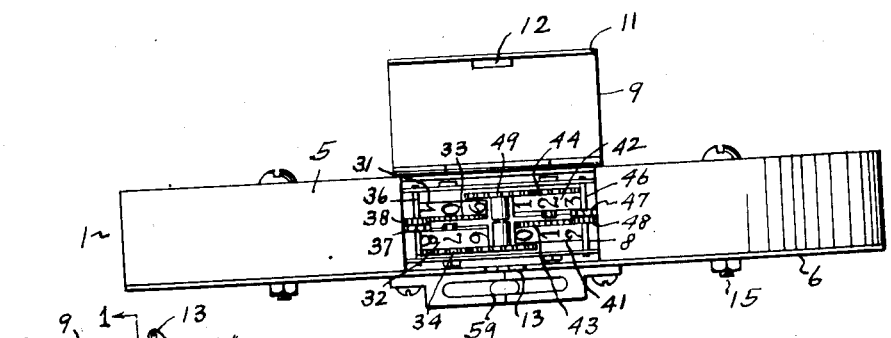
Figure 2 shows a plan view thereof showing the cover plate in open position.
Figures 3, 4:
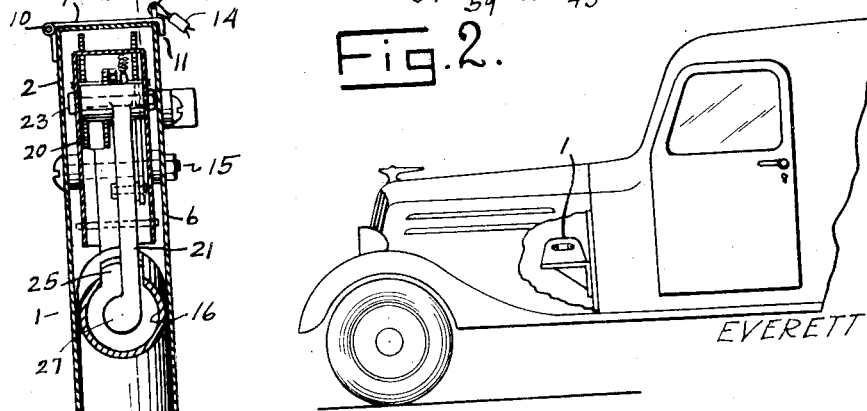
Figure 3 shows a vertical, sectional view taken on the line 3—3 of Figure 1.
Figure 4 shows the complete device as mounted on a vehicle.

The mid portion of the top 5 may be cut away leaving the opening 8 for access to, or inspection of, the registering devices. This opening may be closed by the lid or covering 9 which, at one margin, is hinged to an upper margin of the side 2 by the hinge 10. The other margin of the lid 9 has the downwardly turned flange 11 to engage over the upper or free margin of the side 6, and is also provided with the slot 12 to receive the projection 13 extending upwardly from the upper margin of the side 6 and provided with an opening to receive the hasp of the lock 14 whereby the cover 9 and the side 6 may be locked in closed position to prevent outside interference. When the device is installed and in use the sides 2 and 6 may also be secured together by means of the bolts 15, 15 as more clearly shown in Figure 2.

Enclosed within the lower portion of the casing is an arcuate tube 16 forming a guide. This tube is arched upwardly as shown in Figure 1. Its ends may contain suitable bumpers as 17, 17 preferably formed of rubber and resting against said bumper are the spherical inertia weights 18, 19 the latter being somewhat heavier than the former. Above the tube 16 and enclosed within the casing and anchored in position by the bolts 15 is an inverted box-like housing 20.

There are the actuating arms 21, 22 whose upper ends are pivoted in the housing on the transverse pins 23, 24. These arms extend downwardly through the oblong slots 25, 26 cut through the upper side of the tube 16 and their lower ends terminate in the enlarged targets 27, 28 in the tube. The outward movement of the arms 21, 22 is limited by the transverse stops 29, 30 as shown in Figure 1.

Within the housing 20 between the arms 21, 22 are the registering devices. These registering devices are of well known construction and two have been provided one to register abnormal or too quick startings, and the other to register abnormally sudden stops. The former includes the rotatable discs 31, 32 independently rotatable on a common axis. They are provided with the respective gear wheels 33, 34.

Pivotally mounted on the arm 21 is a dog 35 whose free end cooperates with the teeth of the gear wheel 34 so that when the arm 21 is actuated, as hereinafter described a partial rotation will be imparted to the gear wheel 34 and to the corresponding disc 32. Fixed on a transverse shaft 36, mounted in the housing 20, is the star wheel 37 and the adjacent spur gear 38, the latter of which is in mesh with and drives the gear 33 and the corresponding disc 31. Upon complete rotation of the disc 32 the star wheel 37 will be given a partial rotation by a projection mounted on the disc 32 so as to partially rotate the disc 31.

The discs 31, 32 have the indicating numerals on their periphery from zero to 9 so that the two discs have a registering range from zero to ninety-nine. In case the vehicle is started too suddenly the inertia of the weight 18 will cause it to strike the target 27 of the arm 21 actuating said arm to cause a partial rotation of the gear 34 and the corresponding disc 32. A count of the number of similar abnormal starts will thus be revealed by the registering device just described. The lid 9 is raised and then, when a reading has been taken the discs may be reset by manual rotation of the gear 39 which is mounted on a suitable shaft 40 and which is in mesh with the gear 34.

As the vehicle attains normal speed the weight 18 will roll back to its original position as shown in Figure 1.

The stopping register includes the discs 41, 42 similar to the discs 31, 32 and mounted to rotate on a common axis and having the gears 43, 44 fixed thereto. A dog 45 is pivoted at one end on the arm 22 and its other, or free, end cooperates with the gear or ratchet wheel 44 and partially rotates the latter, as well as the disc 42 upon each actuation of the arm 22. Fixed on the shaft 46, which is mounted to rotate in the housing there is the star wheel 47 and the adjacent spur gear 48, the latter of which is in mesh with the gear 43. Each rotation of the disc 42 imparts a partial rotation to the star wheel 47 in the conventional manner by a projection mounted on the disc 42 and to the gears 48, 43 and the disc 41. The discs 41, 42 have the marginal numbers on their periphery from zero to nine and consequently have the registering capacity from zero to ninety-nine. Of course, both registering devices may be composed of a greater number of discs if desired to increase the capacity thereof combined in the same manner as hereinabove indicated. The stop register may be set back to zero manually when a reading has been taken by manually turning the gear wheel 49 which is in mesh with the gear wheel 44.

Upon an abnormally sudden stop of the vehicle the weight 19 will be projected forwardly against the target 28 actuating the lever 22 and operating through the dog 45 to partially turn the gear wheel 44 and the disc 42. Each additional abnormally sudden stop will add an additional movement and count, to the corresponding register. The weight 19, after being projected forwardly, will return to its original position by gravity. The arms 21, 22 are normally returned to original, or inactive, position by the pull springs 50, 51, which are attached at their outer ends to the pivot ends of the arms 21, 22 and at their inner ends to the top wall of the housing 20.

At intervals, for example, at the end of each trip, the lid 9 may be opened and the abnormal stops or starts made during the trip thus readily ascertained and the proficiency of the driver thus determined, and the counters may be reset in the manner hereinbefore described.

Between the targets 27, 28 and located in the tube 16 but insulated therefrom are the flexible tongues 52, 53 which are connected, through the conductor 54 with an electrical source such as a battery 55 which may be grounded on the vehicle frame. Incorporated into the conductor 54 there is a signal device 56, such as an electric light globe. When the arms 21, 22 are actuated they will be moved to electrical contact with the corresponding tongues 52, 53. These arms 21, 22 are electrical conductors and are grounded on the casing at 57, 58 and upon contact of either arm with its corresponding tongue an electrical circuit will be completed through the warning light. The driver of the vehicle will therefore be informed of the register of abnormal starts and stops being made by him.

The register, when installed, should be level to insure its proper working. For that reason a level indicator 59 may be installed thereon.

The outer casing 1 should be made of aluminum or other non-magnetic material to prevent magnetic interference with the operation of the enclosed mechanism.

The drawing and description disclose what is now considered to be a preferred form of the invention by way of illustration only, while the broad principle of the invention will be defined by the appended claims.

I claim:

1. In a device of the character described for use on a motor vehicle, comprising an upwardly arched guide means, a counter, means for actuating the counter comprising a gear connected to the counter, a pivoted arm extending into the guide means, a pawl pivotally connected to the arm and adapted to engage and rotate said gear upon movement of said arm in one direction, yieldable means adapted to return said arm to the original position, a stop adapted to halt said arm in original position whereby the pawl is allowed to engage another tooth on the gear, a freely movable body in the guide means effective to actuate said arm and pawl, to actuate the counter upon abnormal operation of the vehicle supporting the device.

2. In a device of the character described for use on a motor vehicle, comprising an upwardly arched tube forming a guide having a lengthwise slot in the upper side thereof, a counter, means for actuating the counter including a gear connected to the counter, an arm pivoted at its upper end and whose lower end extends through said slot into the guide, a pawl pivotally connected to an intermediate portion of the arm and adapted to engage and rotate the gear upon movement of the arm in one direction, yieldable means connected to the arm to return said arm to its original position, a stop for limiting the return movement of said arm whereby the pawl is allowed to engage another tooth on the gear, a freely movable body confined within the guide and effective, by its inertia, to actuate said arm and pawl and to thereby actuate the counter upon abnormal operation of the vehicle.

EVERETT L. BACON.